(12) United States Patent  
Song

(10) Patent No.: US 7,463,480 B2  
(45) Date of Patent: Dec. 9, 2008

(54) FOLDABLE KEYBOARD

(75) Inventor: Sung-Ming Song, Taipei (TW)

(73) Assignee: Inventec Corporation, Taipei (TW)

( * ) Notice: Subject to any disclaimer, the term of this patent is extended or adjusted under 35 U.S.C. 154(b) by 74 days.

(21) Appl. No.: 11/601,662

(22) Filed: Nov. 20, 2006

(65) Prior Publication Data

US 2008/0117571 A1    May 22, 2008

(51) Int. Cl.
*G06F 1/16* (2006.01)
(52) U.S. Cl. ............... 361/680; 345/168; 341/176; 400/680
(58) Field of Classification Search ........... 345/168, 345/156, 169; 312/223.1–223.6; 455/575.1, 455/90.3, 580; 84/744; 361/679–687, 724–727; 341/25, 20, 176; 400/680, 682; 16/341, 16/367
See application file for complete search history.

(56) References Cited

U.S. PATENT DOCUMENTS

| | | | |
|---|---|---|---|
| 6,191,938 B1 * | 2/2001 | Ohgami et al. .......... 361/681 |
| 6,687,518 B1 * | 2/2004 | Park .................. 455/575.1 |
| 6,785,126 B2 * | 8/2004 | Hazzard et al. .......... 361/680 |
| 2003/0080944 A1 * | 5/2003 | Takahashi et al. ........ 345/168 |
| 2006/0117939 A1 * | 6/2006 | Lai ..................... 84/744 |
| 2006/0284523 A1 * | 12/2006 | Chen et al. ........... 312/223.2 |

* cited by examiner

*Primary Examiner*—Hung V Duong
(74) *Attorney, Agent, or Firm*—Muncy, Geissler, Olds & Lowe, PLLC

(57) ABSTRACT

A foldable keyboard applicable in a notebook computer is provided. The notebook computer includes a body provided with a keyboard accommodation groove for accommodating and holding the foldable keyboard. Furthermore, the foldable keyboard includes at least one separating segment and a fixed body connected with the separating segment by an adhesive film. When the user of the notebook computer lifts the separating segment of the foldable keyboard, the keyboard can be folded by the user of the notebook computer rapidly, thus the purpose of rapid replacement and upgrade the peripherals can be achieved.

4 Claims, 4 Drawing Sheets

FOLDABLE KEYBOARD

BACKGROUND OF THE INVENTION

1. Field of Invention

The present invention relates to a foldable keyboard, and more particularly, to a foldable keyboard capable of enabling rapid folding of the notebook computer so as to replace and upgrade peripherals easily.

2. Related Art

Nowadays, the hardware structure of the notebook computer has been developed towards convenient assembly. As for the keyboard assembly, the conventional keyboard is fastened to the housing of the notebook computer with screws. The process thereof is very complicated and brings much inconvenience in fastening and operating. Furthermore, since there are many electronic units, such as a hard disk, a central processing unit, and various interface cards, in the notebook computer, the keyboard has to be disassembled when dismounting or performing maintenance on the electronic units. Thus, with the conventional keyboard fastened to the housing of the notebook computer, much inconvenience is caused during maintenance, which is labor consuming and time consuming.

Furthermore, nowadays many manufacturers producing conventional notebook computers provide devices that can be upgraded and replaced by the user of the notebook computer for, for example, upgrading memory, adding memory, replacing and upgrading the central processing unit, and even replacing most of the peripherals of the computer, wherein most of the above devices that can be upgraded by the users are disposed below the keyboard to facilitate replacement and upgrade.

However, it is impossible for the user to know the design modes of the originally manufactured housings when they want to replace and upgrade devices all by him/herself. Therefore, specialized retailers and the manufacturer of the housing are asked to help. That is because most of the housing structures as designed in the above notebook computer must be disassembled to replace the peripherals in the housing.

Referring to FIG. 1 for the defect of disassembling the housing in the conventional technology, although the present notebook computer P1 is designed comprising a keyboard P10 and a housing P20 of the notebook computer P1. The keyboard P10 can be disassembled directly to facilitate the replacement and upgrade of the peripherals in the housing P20. However, the conventional keyboard P10 matched with the housing P20 of the notebook computer P1 is configured integrally, and when the keyboard P10 is disassembled directly to replace the electronic unit P30, the electrical connection thereof will be affected, which results in a poor contact. Furthermore, this design makes it easy for manufacturers to assemble the computer, but for users with little assembly experience, it is difficult and complicated. Moreover, if the electrical connection of the keyboard and the notebook computer is lifted due to carelessness of the user, the keyboard will fail to function due to the poor contact of its pins.

Therefore, when the user wants to replace and upgrade the peripherals of the notebook computer, the conventional keyboard designed to be configured integrally has the disadvantage of having the keyboard damaged such that the keys fail to function normally. Thus, it has become an object for researchers how to redesign a foldable keyboard that can facilitate the replacement and upgrade of the peripherals of the notebook computer by the user without damaging the keyboard.

SUMMARY OF THE INVENTION

In view of the problems in the conventional techniques, the present invention relates to provide a structure for fastening the peripherals of a notebook computer, to resolve the problem that the keyboard of the conventional notebook computer cannot be folded or disassembled easily due to its integral configuration. The defect that peripherals of the conventional notebook computer cannot be replaced or upgraded easily since the user fails to fold the keyboard can be overcome.

In order to achieve the above objects, the present invention provides a foldable keyboard applicable to a notebook computer. The notebook computer comprises a body and a foldable keyboard. The body is provided with a keyboard accommodation groove for accommodating and holding the foldable keyboard. Furthermore, the foldable keyboard comprises at least one separating segment and a fixed body connected with the separating segment by an adhesive film. The purpose of rapid folding of the keyboard can be achieved when the user of the notebook computer lifts the separating segment of the foldable keyboard.

By using a foldable keyboard of the present invention, at least the following effects can be achieved.

1. By employing the foldable keyboard provided by the present invention, since the keyboard of the notebook computer comprises at least one separating segment, when the user of the notebook computer wants to replace or maintain the peripherals, the replacement or the maintenance of peripherals can be realized rapidly and easily without disassembling the whole foldable keyboard. Compared with the conventional keyboard designs, the present invention not only reduces the time and cost of maintenance, but is quite convenient for the user who wants to upgrade peripherals.

2. By employing the foldable keyboard provided by the present invention, since the keyboard of the notebook computer comprises at least one separating segment, the peripherals to be replaced by the users themselves can be disposed below the foldable keyboard, and the foldable keyboard disposes different separating segments corresponding to the peripherals. Thus the customerized production can be achieved according to the different demands of customers. Furthermore, the present invention is quite unique due to its customerized production.

In order to make the objects, the structural features and the functions of the present invention more comprehensible, the present invention will be described in detail by preferred embodiments with accompanied drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Figure 1:
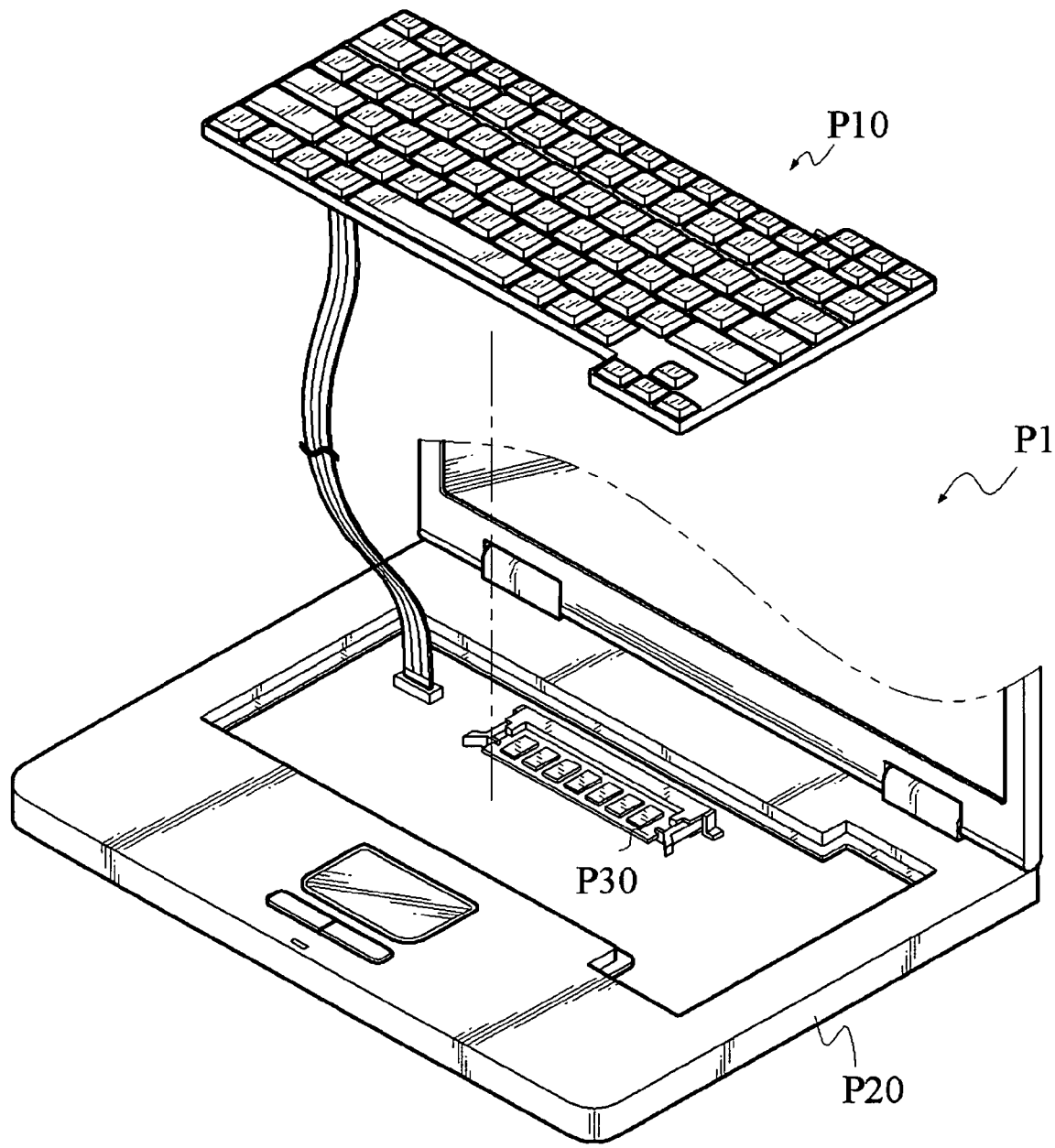
FIG. 1 is a schematic view of a conventional keyboard combined with a notebook computer.
Figure 2:
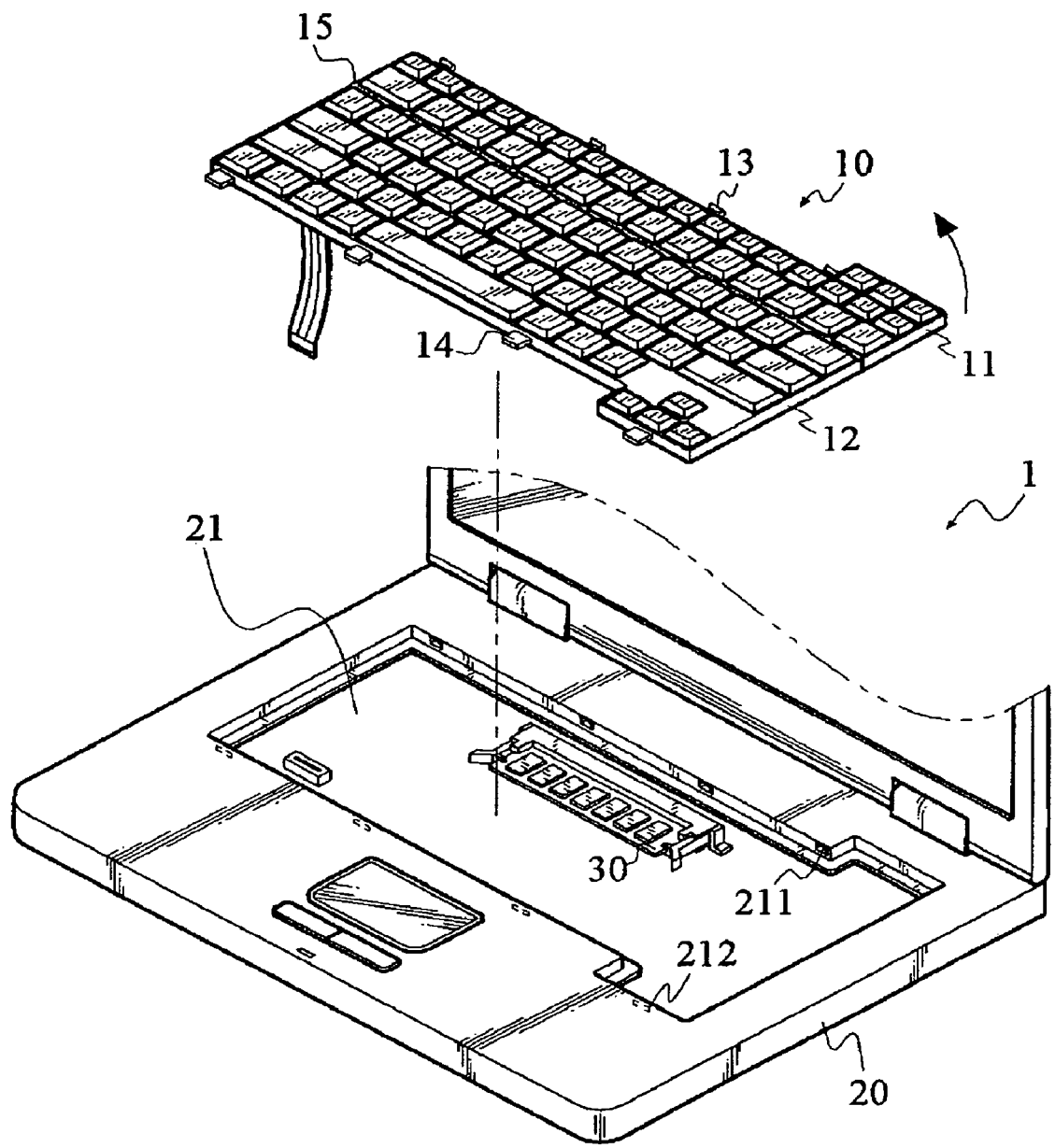
FIG. 2 is a schematic view of a foldable keyboard of the present invention combined with a notebook computer.

Referring to FIG. 2, a foldable keyboard is provided by the present invention and is applicable to a notebook computer. The notebook computer 1 comprises a body 20 that is provided with a keyboard accommodation groove 21 for accommodating and holding the foldable keyboard 10. The foldable keyboard 10 comprises at least one separating segment 11 and a fixed body 12 connected with the separating segment 11 by an adhesive film 15. A plurality of electronic units 30 is disposed respectively in the keyboard accommodation groove 21 of the body 20.

Figure 3:
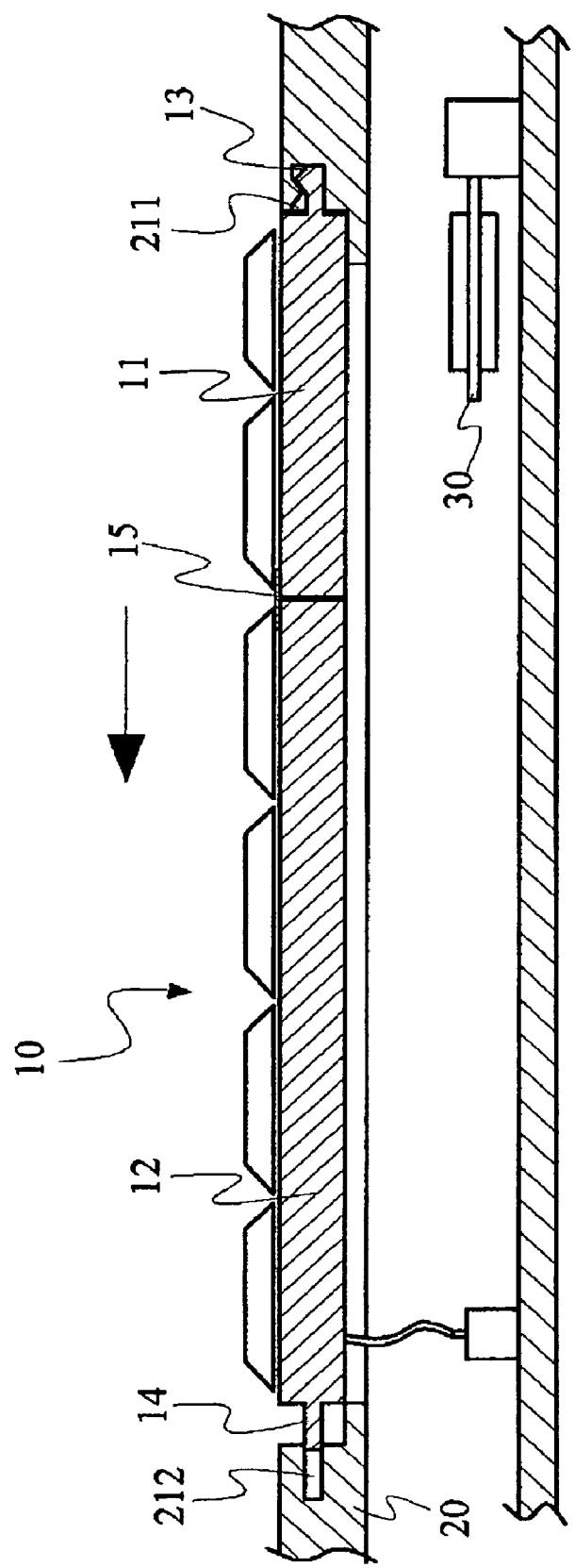
FIG. 3 is a schematic sectional view of a foldable keyboard of the present invention combined with a notebook computer.
Figure 4:
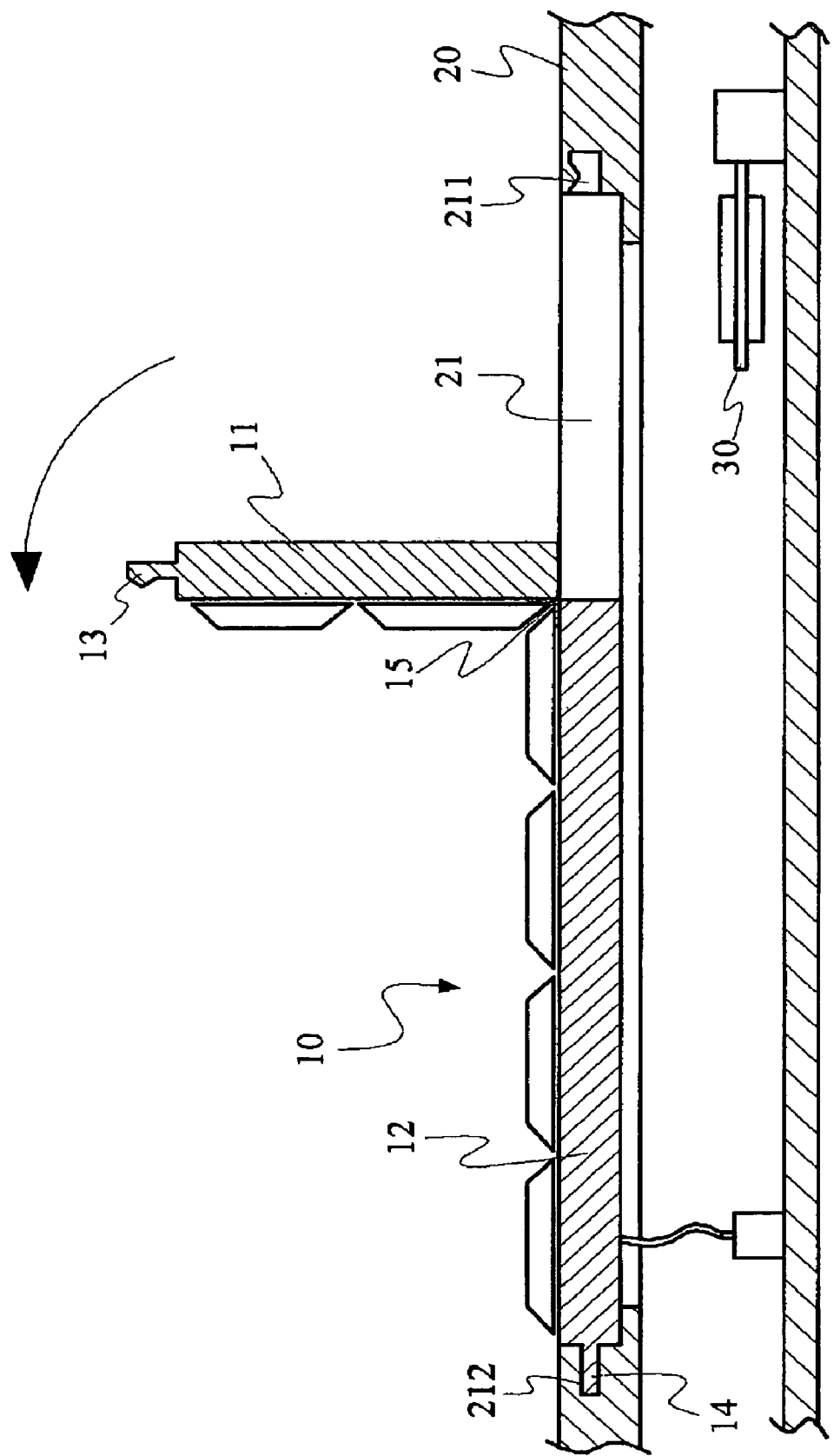
FIG. 4 is a schematic sectional view of an action of the foldable keyboard combined with a notebook computer.

Referring to FIG. 2, FIG. 3, and FIG. 4, the foldable keyboard provided by the present invention is applicable to a notebook computer. At least one fastening hole 211 and at least one fixing hole 212 are further disposed in the keyboard accommodation groove 21 of the body 20 of the notebook computer 1. The foldable keyboard 10 is configured with at least one fastening portion 13 and at least one fixing piece 14 corresponding to the fastening hole 211 and the fixing hole 212 of the above keyboard accommodation groove 21. The foldable keyboard 10 is held in the keyboard accommodation groove 21 by fastening and fixing the fastening portion 13 and the fixing piece 14 of the foldable keyboard 10 to the fastening hole 211 and the fixing hole 212 respectively. Alternatively, by pushing the foldable keyboard 10, the fastening portion 13 thereof is made to disengage from the fastening hole 211 of the keyboard accommodation groove 21, thus the separating segment 11 contained by the foldable keyboard 10 can be lifted and departed from the keyboard accommodation groove 21. Of course, the foldable keyboard 10 can be lifted and departed from the keyboard accommodation groove 21 owing to the separating segment 11 thereof. Therefore, the circuits are not designed to distribute in the separating segment 11, that is, the electrical connections are not disposed in the separating segment 11. Thus, when the user of the notebook computer 1 wants to replace or upgrade the plurality of electronic units 30 (these electronic units 30 can be memory modules) disposed in the keyboard accommodation groove 21 of the body 20, the foldable keyboard 10 can be pushed first such that the fastening portion 13 thereof is made to disengage from the fastening hole 211, thus the separating segment 11 of the foldable keyboard 10 can be lifted and departed from the keyboard accommodation groove 21. Since electrical connections are not disposed in the separating segment 11 of the foldable keyboard 10, the replacement or upgrade carried out by the user will not cause a poor contact in the electrical connection. Rapid replacement or upgrade of the electronic units 30 can be achieved since the separating segment 11 of the foldable keyboard 10 can be separated in numerous angles.

Furthermore, in the foldable keyboard provided by the present invention applicable to a notebook computer, the keyboard accommodation groove 21 of body 20 of the notebook computer 1 can be further provided with an electromagnetic-interference proof pad (not shown), which is overlaid on the surface of the keyboard accommodation groove 21 for preventing the operation efficiency of the notebook computer 1 from being interfered by electromagnetism during operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A foldable keyboard applicable to a notebook computer, wherein the notebook computer comprises a body provided with a keyboard accommodation groove for accommodating and holding the foldable keyboard, the keyboard accommodation groove of the body provided with at least one fastening hole and at least one fixing hole opposite to the fastening hole, the fastening hole and the fixing hole respectively disposed in two opposite sidewalls of the keyboard accommodation groove, the foldable keyboard comprises
 a fixed body, the fixed body comprising at least one fixing piece corresponding to the fixing hole;
 at least one separating segment, the separating segment comprising at least one fastening piece corresponding to the fastening hole; and
 an adhesive film, for connecting the fixed body with the separating segment,
 wherein the foldable keyboard is held in the keyboard accommodation groove by fastening and fixing the fastening portion and the fixing piece to the fastening hole and the fixing hole respectively, and alternatively, the foldable keyboard is folded by departing the separating segment from the keyboard accommodation groove when the foldable keyboard is pushing toward fixing direction of the fixing piece fixed into the fixing hole, such that the fastening portion is disengaged from the fastening hole.

2. The foldable keyboard as claimed in claim 1, wherein the separating segment of the foldable keyboard is capable of being separated in numerous angles.

3. The foldable keyboard as claimed in claim 1, wherein a plurality of electronic units is disposed in the keyboard accommodation groove of the body.

4. The foldable keyboard as claimed in claim 3, wherein the electronic units are memory modules.

* * * * *